United States Patent [19]

Farnworth et al.

[11] Patent Number: 4,981,738

[45] Date of Patent: Jan. 1, 1991

[54] ALMOST IMPERMEABLE CHEMICALLY PROTECTIVE FABRIC

[75] Inventors: Brian Farnworth, Kinburn; Randall J. Osczevski, Nepean, both of Canada

[73] Assignee: Her Majesty the Queen in right of Canada, as represented by the Minister of National Defence of Her Majesty's Canadian Government, Ottawa, Canada

[21] Appl. No.: 337,412

[22] Filed: Apr. 13, 1989

[30] Foreign Application Priority Data

Sep. 26, 1988 [CA] Canada .................................. 578467

[51] Int. Cl.$^5$ .............................................. B32B 3/14
[52] U.S. Cl. ......................................... 428/55; 428/56; 428/60; 428/109; 428/111; 428/189; 428/190; 428/227; 428/245; 428/252; 428/253; 428/323; 428/408
[58] Field of Search ............................... 428/189–190, 428/120, 252, 253, 323, 408, 919, 911, 55, 56, 60, 109, 111, 227, 245; 2/2.5, 243 A, 243 B

[56] References Cited

U.S. PATENT DOCUMENTS

| | | | |
|---|---|---|---|
| 4,214,321 | 7/1980 | Nuwayser | 2/167 |
| 4,241,457 | 12/1980 | Klein et al. | 2/2.5 |
| 4,816,330 | 3/1989 | Freund et al. | 2/243 A |

*Primary Examiner*—Marion C. McCamish
*Attorney, Agent, or Firm*—Nixon & Vanderhye

[57] ABSTRACT

This invention relates to a multi-layer protective fabric for protective suits used in hazardous or toxic environments. A first layer comprises strips of water and vapor impermeable material, there being a gap between adjacent such strips. A second layer comprises a plurality of strips of a wicking material with each such strip covering the inner surface of a first layer strip, passing through the gap between adjacent strips and covering the outer surface of the adjacent first layer strip. Moisture, such as perspiration will pass via the wicking material through the gaps past the first layer for evaporation and diffusion through a third layer of a liquid impermeable/vapor permeable material which extends over the second layer material covering the outer surfaces of the first layer.

14 Claims, 1 Drawing Sheet

ALMOST IMPERMEABLE CHEMICALLY PROTECTIVE FABRIC

The present invention relates to protective fabrics for use in hazardous environments and to protective suits manufactured from such fabrics.

BACKGROUND OF THE INVENTION

Protective suits are worn by both civilian and military personnel whenever there is a chance of exposure to hazardous environments such as toxic chemicals or vapours, or nuclear, biological or chemical (NBC) warfare situations. Such suits must be impermeable to the toxic or harmful vapours but, as a consequence, such suits quickly become uncomfortable to wear because they do not allow for adequate evaporation of perspiration. Suits which are permeable to vapours may include a layer of activated charcoal for absorbing harmful agents but with time and use the absorptive capacity of the charcoal becomes saturated with water by various organic components of perspiration or by chemical agents. Thus the useful life of a vapour permeable suit, which permits the slow evaporation of perspiration, is limited by the useful life of the activated charcoal. There is therefore a need for a protective suit made from a fabric that will permit efficient removal of perspiration and thereby improve the interior environment of the suit for the wearer.

SUMMARY OF THE INVENTION

The present invention provides a multi-layer fabric which: is impermeable to liquids; is impermeable to air currents; is impermeable to, or has a very low permeability to, most vapours; and which will pass water or moisture by a combination of liquid wicking and vapour diffusion.

The multi-layer protective fabric of this invention include a first or barrier layer formed from strips of a liquid and vapour impermeable material, there being a slight gap between adjacent first layer strips. A second layer includes a plurality of strips of wicking material with each second layer strip covering an inner surface of one first layer strip, extending through the gap between adjacent first layer strips and covering the outer surface of the adjacent first layer strip. The third layer is formed of a liquid impermeable/vapour permeable material and extends over the second layer material that covers the outer surfaces of the first layer material. If desired a fourth layer of a fabric material can cover the third layer for reinforcement purposes.

When a protective suit made from the fabric of this invention is in use, the innermost wicking material of the second layer will absorb perspiration from the skin of the wearer and when it is saturated thereby the moisture will be carried through the gaps between adjacent strips of the first layer to the outermost wicking material of the second layer from which it will evaporate and diffuse through the third layer, carrying with it its latent heat of vaporization and cooling the body of the wearer.

Other features of the present invention will become apparent from the description which follows.

DESCRIPTION OF THE PREFERRED EMBODIMENT

Figure 1:
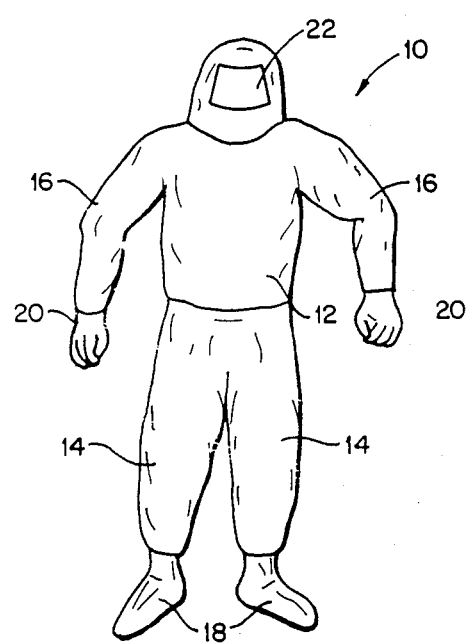
FIG. 1 illustrates generally a protective suit as might be made by the protective fabric of this invention.

FIG. 1 illustrates generally a protective suit 10 which might be worn in conditions of nuclear, biological or chemical (NBC) warfare or which might be worn by anyone working normally with hazardous (e.g. toxic) materials. Such a suit is designed to be generally impervious to the dangerous material and it will be integrally formed with torso, leg, arm, boot and glove portions 12, 14, 16, 18, 20 respectively. A helmet 22 is sealingly connectable to the suit. The number of seams is kept to a minimum so as to present the least number of avenues by which dangerous material could breach the integrity of the suit.

A protective suit that effectively prevents the intrusion of vapours, liquids or gases will, perforce, present problems with respect to the dissipation of internal moisture, such as perspiration, making the interior of the suit very uncomfortable over long periods of time, especially in high ambient temperatures. The fabric of the present invention is intended to improve the climatic conditions within such a suit so that the wearer of such a suit may perform his tasks without any great concern respecting personal comfort.

Figure 4:
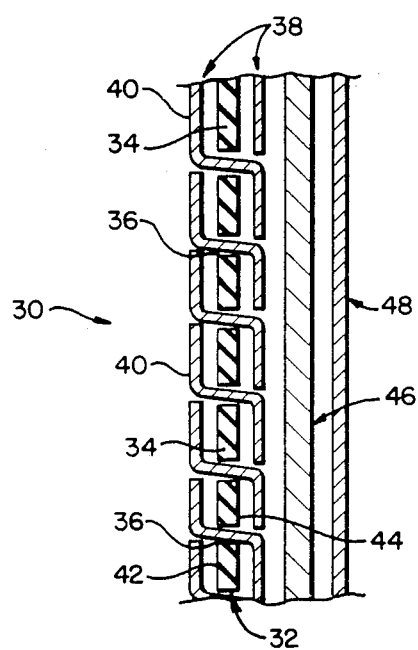
FIG. 4 shows a slightly exploded view of FIG. 3.
Figure 2:
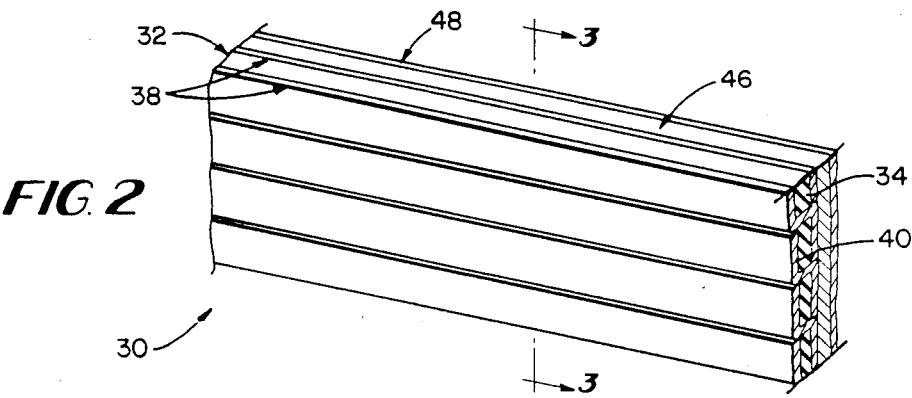
FIG. 2 illustrates in perspective a portion of the protective fabric of this invention.
Figure 3:
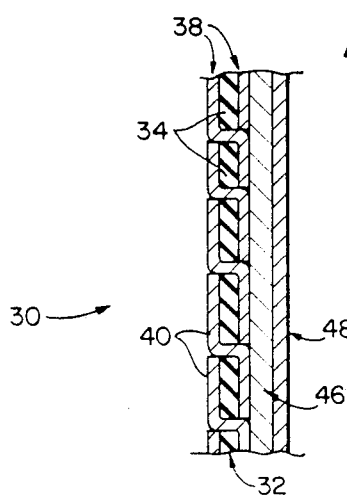
FIG. 3 shows a section of the fabric taken on the line 3—3 of FIG. 2.

One embodiment of the fabric of the present invention is illustrated schematically in FIGS. 2 to 4, it being understood that large sheets of the material would be provided for subsequent manufacture into protective suits or portions thereof. For example, it might be necessary to make only the arms and gloves of a protective suit from the material of the present invention if only the arms and gloves will be subjected to hostile environments.

With reference to FIGS. 2 to 4, it will be seen that the fabric 30 of the present invention includes a plurality of layers of material bonded together by a suitable bonding agent to create a multi-layer effect. The first layer 32 is a barrier layer made from a plurality of strips 34 of a water and vapour impermeable material such as butyl rubber with or without a fabric or textile backing. The strips 34 will be from 10 to 100 mm wide, with an optimum width in the order of 20 mm. The strips 34 are spaced apart so as to define a narrow gap 36 between the edges of adjacent strips. The first layer 32 will be the main barrier to toxic vapours.

The second layer 38 actually appears as two layers but is considered to be a single layer for the purpose of this description. The layer 38 comprises a plurality of strips 40 of a wicking material. Each strip 40 is interwoven with a pair of adjacent first layer strips 34 such that each second layer strip covers the inner surface 42 of one first layer strip, extends through the gap 36 between adjacent first layer strips and covers the outer surface 44 of the adjacent first layer strip. It will therefore be seen that: (a) the gap 36 has a width approximately equal to the thickness of the second layer wicking material; (b) each second layer strip has a width approximately double the width of a first layer strip; and (c) when the first and second layers are woven together both the inner and outer surfaces of the first layer will be covered by second layer wicking material, with connections between the second layer coverings being achieved by the material portions that pass through the gaps 36.

The purpose of the wicking material of the second layer 38 is to provide a path for the transfer of moisture such as perspiration through the first or barrier layer 32. Thus each strip 40 should be formed from a material which wicks well but is as thin as possible. Suitable materials could be woven or knitted fabrics of nylon, polyester, polypropylene, or blends thereof with cotton or nonwoven fibrous materials having a paper-like structure, as long as such fibrous materials have been surface-treated to make them wettable. A thin fabric, rather than a thick fabric, is desired since a thin material has a lower threshold at which wicking will commence.

A third layer 46 is provided in contact with the portions of the second layer 38 covering the outer surfaces of the first layer. The material of layer 46 is liquid impermeable/vapour permeable and its purpose is to keep liquid chemicals away from the wicking material since such chemicals could be otherwise transported inwardly past the barrier layer 32 in the same way that moisture can wick outwardly. The material of the third layer 46 could be a conventional woven or nonwoven textile fabric which is not really liquid impermeable but which has been treated with a suitable liquid repellent such as ZEPEL-B (trade mark). If there is concern that the repellency may not be adequate to keep liquids out in the event that the material becomes dirty, is flexed repeatedly, or is subjected to pressure then an alternative would include a microporous film or coating such as DERMOFLEX (trade mark) or GORETEX (trade mark) GENERATION I. Such substances also rely on repellency to keep liquids out but, because of their miniscule pore size, they are much more resistant to the penetration of liquids under pressure. Another alternative is a polymer layer which is not microporous but is permeable to the diffusion of water vapour because of the hydrophilic chemical nature of the polymer itself. Such polymer layers are often used in conjunction with microporous membranes as in DERMOFLEX with an NPU-23 top coat or in GORETEX GENERATION II. Other such polymers are applied directly to woven textile fabrics, e.g. STEDTHANE (trade mark).

Coatings which are microporous have the advantage of high vapour permeability under all conditions. Hydrophilic continuous films on the other hand are only vapour permeable under very humid conditions. This is not a disadvantage with the present invention since the entire fabric will only transmit water if the inside is actually wet. Hydrophilic films may be usable in situations where selective permeability is desirable as they are permeable to water vapour but not to simple inorganic gases such as oxygen or carbon dioxide and they may also be impermeable to certain chemical agents.

The outermost or fourth layer 48 is a conventional woven or knitted fabric and is provided, as necessary, to give strength and abrasion resistance to the overall fabric. There may be instances where a fourth layer is not required, a suitable fabric being composed of only the first three layers as described hereinabove.

The fabric of the present invention has a low permeability to all gases because most of its area consists of the impermeable first layer 32 with only the gaps 36 being permeable to vapour. Each gap is, ideally, only as wide as the thickness of the wicking material, about 0.3 mm and thus the permeability of the fabric of this invention is reduced in comparison with an uncoated fabric of similar thickness by a factor equal to the ratio of the strip width to the gap width, a factor of 67 for a first layer strip width of 20 mm and a gap width of 0.3 mm.

The manner in which the fabric of the present invention operates when manufactured into a protective suit, the foremost application for the fabric, is relatively straightforward. When worn by an actively perspiring user, the fabric of the suit will become wet on the inside either by direct transfer of liquid water from the skin to the wicking material or by an evaporation/diffusion/condensation process. When the wicking material 40 covering the inner surfaces 42 of the first layer 32 becomes saturated, water will wick past the layer 32 via the gaps 36 and will then reach the material 40 covering the outer surfaces 44 of the layer 32. From there the water will evaporate, diffuse through the outer layer(s) 46 (and 48) and escape to the environment, taking with it its latent heat of vaporization and cooling the body. For maximum cooling efficiency, the fabric of this invention should be positioned as closely as possible to the wearer's body. When constructing the suit one could use form-fitting stretch fabrics for the first, third and fourth layers or each suit could be carefully tailored to the body of each specific wearer and thus use non-stretch fabrics.

For general clothing use, the fabric of the invention should be as light in weight as possible, with each layer in the order of 50 g/m$^2$ except for the first (barrier) layer which can be heavier, giving a total for the fabric of 300 to 500 g/m$^2$. Higher fabric weights may be necessary if abrasion resistance is a priority. The entire suit, or only portions thereof, could be made from the fabric of the present invention. A heavier version could also be used as boot uppers.

The permeability of the fabric of this invention to chemical vapours should be low when the materials thereof are dry but may be substantially higher when they are wet. If the chemical agent is insoluble in water, there will, of course, be no increase in permeability. However, if the chemical agent is water soluble, it could be transported past the barrier (first) layer 32 by diffusion in the water-soaked (by perspiration) wicking material. To prevent this, the wicking material may be treated with a material that can absorb or chemically destroy the agent. Since the chemical agent can only penetrate by diffusing over a length of several centimeters the area of contamination by the chemical agent will be large and only a small quantity of absorbing or reactive substance need be added to the wicking material. The absorbing substance can be relatively inefficient when compared to the activated charcoal used in existing chemically protective suits and a micro-encapsulated charcoal or a microencapsulated reactive chemical can be used. This provides the advantage of long shelf life and the freedom from contamination by perspiration. Existing chemically protective suits use 10 g/m$^2$ to 100 g/m$^2$ of activated charcoal. With the present invention it is estimated that equivalent protection can be obtained by using from 1/100 to 1/10 of that amount.

Figure 5:
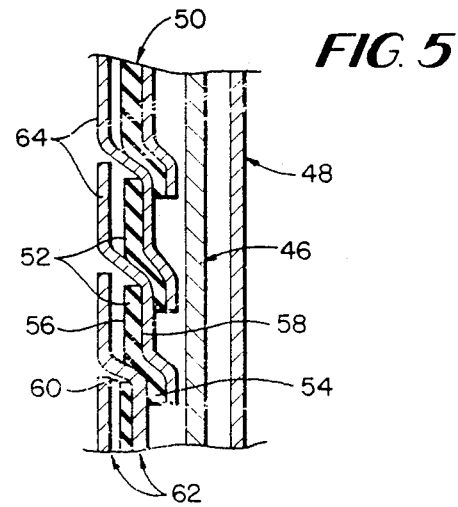
FIG. 5 shows a slightly exploded view, similar to FIG. 4, of a second embodiment of the invention.

FIG. 5 illustrates in a partially exploded form an alternative construction for the fabric of this invention. Layers 46 and 48, the latter being optional, are the same as for the first embodiment and will not be described any further.

In this embodiment, the first or barrier layer 50 comprises a plurality of strips 52 of the same material as strips 34. However, in this case, a portion 54 of each strip 52 along one edge thereof is displaced slightly so that the portion of the inner surface 56 along the portion 54 overlies or overlaps a portion of the outer surface 58 of an adjacent strip 52. The overlapping portions define a gap 60 between the adjacent strips 52. The second, or wicking, layer 62 comprises a plurality of strips 64 of wicking material, each strip covering the inner surface 56 of one first layer strip 52, extending through the gap 60 and covering the outer surface 58 of the adjacent first layer strip, including the overlapping portion 54. The layers are bonded together as in the first embodiment.

The degree of overlap by portion 54 will be in the order of a few millimeters. This ensures that the gap 60 cannot be more than the thickness of the wicking material and with this embodiment the wicking path is lengthened in comparison to the first embodiment. With this embodiment the overall permeability of the fabric can be reduced by a factor of about 10. The overall permeability is still further reduced if the third layer 46 offers any substantial resistance to the diffusion of chemical vapours.

The fabric of the present invention provides clear advantages over existing protective fabrics by using wicking materials to pass water through an otherwise impermeable fabric. Two embodiments of the fabric of this invention have been described but, undoubtedly, a skilled person in the art could develop other fabric constructions without departing from the spirit of the invention. Thus the scope of protection to be afforded this invention is to be determined from the claims appended hereto.

THE EMBODIMENTS OF THE INVENTION IN WHICH AN EXCLUSIVE PROPERTY OR PRIVILEGE IS CLAIMED ARE DEFINED AS FOLLOWS:

1. A protective fabric comprising a plurality of material layers bonded together and including: a first layer formed from a plurality of adjacent strips of liquid and vapour impermeable material, adjacent strips being spaced apart from each other by a slight gap, each first layer strip having an inner surface and an outer surface; a second layer formed from a plurality of strips of wettable fiberous wicking material, each second layer strip covering the inner surface of a first layer strip, extending through the gap between adjacent first layer strips, and covering the outer surface of the adjacent first layer strip; and a third layer of liquid impermeable/vapour permeable material extending over the second layer material covering the outer surfaces of the first layer material.

2. The protective fabric of claim 1 wherein the width of said gap is approximately equal to the thickness of said wicking material.

3. The protective fabric of claim 1 wherein the material of said first layer is a butyl rubber.

4. The protective fabric of claim 1 wherein the material of said first layer is a butyl rubber supported on a textile backing.

5. The protective fabric of claim 1 wherein said wicking material is selected from the group consisting of woven or knitted fabrics of nylon, polyester, polypropylene, or blends thereof with cotton or nonwoven fibrous material, such fibrous material having a surface treatment to make them wettable.

6. The protective fabric of claim 5 wherein the material of said third layer is selected from the group consisting of conventional woven or nonwoven textile fabrics treated with a liquid repellent composition; liquid-resistant microporous films or coatings; hydrophilic polymers; or hydrophilic polymers in conjuction with microporous liquidresistant membranes.

7. The protective fabric of claim 6 including a fourth layer of fabric material covering said third layer, the material of said fourth layer being a conventional woven or knitted fabric.

8. The protective fabric of claim 5 wherein said wicking material is treated with micro-encapsulated charcoal or a micro-encapsulated reactive chemical for absorbing or chemically destroying chemical agents which might penetrate said third layer and reach the wicking material of said second layer.

9. A protective suit manufactured from the protective fabric of claim 1, said suit being designed to have the wicking material of said second layer which covers the inner surface of said first layer in contact with the skin of a wearer of said suit.

10. A reinforcement for vulnerable areas of an article of clothing, said reinforcement being manufactured from the protective fabric of claim 1 such that the wicking material of said second layer which covers the inner surface of said first layer is in contact with the skin of a wearer of said article of clothing.

11. A protective fabric comprising a plurality of material layers bonded together and including: a first layer formed from a plurality of adjacent strips of liquid and vapour impermeable material, each first layer strip having an inner surface and an outer surface, a portion of the inner surface along one edge of one first layer strip overlapping a portion of the outer surface of an adjacent fist layer strip and establishing a gap between said overlapping portions; a second layer formed from a plurality of strips of wettable fiberous wicking material, each second layer strip covering the inner surface of a fist layer strip, extending through the gap between overlapping portions of adjacent first layer strips, nd covering the outer surface of the adjacent first layer strip; and a third layer of liquid impermeable/vapour permeable material extending over the second layer material covering the outer surfaces of the fist layer material.

12. The protective fabric of claim 11 wherein said wicking material is selected from the group consisting of woven or knitted fabrics of nylon, polyester, polypropylene, or blends thereof with cotton or nonwoven fibrous material, such fibrous material having a surface treatment to make them wettable.

13. The protective fabric of claim 12 wherein the material of said third layer is selected from the group consisting of conventional woven or nonwoven textile fabrics treated with a liquid repellent composition; liquid-resistant microporous films or coatings; hydrophilic polymers; or hydrophilic polymers in conjunction with microporous liquid-resistant membranes.

14. The protective fabric of claim 13 including a fourth layer of fabric material covering said third layer, the material of said fourth layer being a conventional woven or knitted fabric.

* * * * *